United States Patent
Barkay et al.

(10) Patent No.: US 9,565,684 B2
(45) Date of Patent: Feb. 7, 2017

(54) SYSTEMS AND METHODS FOR AVOIDING INTERFERENCE FOR A PEER-TO-PEER NETWORK CONNECTION

(75) Inventors: Omri Barkay, Kibutz Sarid (IL); Omer Ben-Shalom, Rishon Le-Tzion (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/977,628

(22) PCT Filed: Apr. 23, 2012

(86) PCT No.: PCT/US2012/034632
§ 371 (c)(1),
(2), (4) Date: May 2, 2014

(87) PCT Pub. No.: WO2013/162492
PCT Pub. Date: Oct. 31, 2013

(65) Prior Publication Data
US 2014/0241187 A1  Aug. 28, 2014

(51) Int. Cl.
*H04W 72/08* (2009.01)
*H04W 76/04* (2009.01)
(Continued)

(52) U.S. Cl.
CPC ......... *H04W 72/082* (2013.01); *H04W 76/043* (2013.01); *H04W 16/14* (2013.01); *H04W 84/12* (2013.01)

(58) Field of Classification Search
CPC ...... H04W 76/04; H04W 84/12; H04W 88/02; H04W 72/08; H04W 72/082
See application file for complete search history.

(56) References Cited

U.S. PATENT DOCUMENTS

2003/0214430 A1* 11/2003 Husted et al. .................. 342/57
2006/0252418 A1* 11/2006 Quinn .................... H04W 16/10
455/423

(Continued)

FOREIGN PATENT DOCUMENTS

JP  2005-223865  8/2005
JP  2009-141901  6/2009
(Continued)

OTHER PUBLICATIONS

International Search Report and Written Opinion received for PCT Application No. PCT/US2012/034632, mailed on Dec. 18, 2012, 9 pages.
(Continued)

*Primary Examiner* — Feben M Haile
(74) *Attorney, Agent, or Firm* — Sutherland Asbill & Brennan LLP (57) ABSTRACT

Systems and methods are described herein for avoiding interfering with 5GHZ frequency band signals with a peer-to-peer wireless local area network connection. A peer-to-peer client is notified of radar signals in proximity to the client over a master-to-client wireless local area connection with an enterprise access point. If the notification includes a non-interfering radar channel, the peer-to-peer client resets the peer-to-peer channel to the non-interfering radar channel. If the notification does not provide a non-interfering radar channel, the peer-to-peer client resets the peer-to-peer network connection to a non-dynamic frequency selection channel and may disconnect the Wi-Fi connection with the enterprise access point.

27 Claims, 3 Drawing Sheets (51) Int. Cl.
*H04W 84/12* (2009.01)
*H04W 16/14* (2009.01)

(56) References Cited

U.S. PATENT DOCUMENTS

| | | |
|---|---|---|
| 2008/0075038 A1 | 3/2008 | Jin et al. |
| 2009/0129273 A1 | 5/2009 | Zou |
| 2009/0146866 A1 | 6/2009 | Matsumoto et al. |
| 2010/0093343 A1* | 4/2010 | Qi et al. .................... 455/432.1 |
| 2010/0278117 A1* | 11/2010 | Sharma ................ H04W 36/06 |
| | | 370/329 |
| 2011/0228666 A1 | 9/2011 | Barbieri et al. |
| 2011/0237246 A1 | 9/2011 | Sen |
| 2014/0003606 A1* | 1/2014 | Birnbaum et al. ............ 380/270 |

FOREIGN PATENT DOCUMENTS

| | | |
|---|---|---|
| KR | 10-2010-0111346 A1 | 10/2010 |
| WO | 2011-116017 | 3/2011 |

OTHER PUBLICATIONS

Office Action for Japanese Patent Application No. 2015-503182 mailed Sep. 1, 2015. 3 pages Japanese Office Action. 3 pages English Translation.
Japanese Office Action received in Patent Application No. 2015-503182, mailed Jan. 26, 2016, 3 pages.
Supplementary European Search Report for European Application No. 12875138 mailed Nov. 19, 2015.

* cited by examiner

SYSTEMS AND METHODS FOR AVOIDING INTERFERENCE FOR A PEER-TO-PEER NETWORK CONNECTION

TECHNICAL FIELD

This disclosure generally relates to systems and methods for implementing peer-to-peer wireless network connections.

BACKGROUND

The use of unlicensed communication frequency bands for IEEE 802.11 wireless local area networks has enabled wireless network usage to expand in a very pervasive manner in the consumer and enterprise arenas. However, the 802.11 devices need to share the band with other non-802.11 devices that are not within the wireless local area network.

In a peer-to-peer environment, the peer-to-peer communications may interfere with non-802.11 devices. Typically, peer-to-peer mobile devices are not capable of detecting signals from the non-802.11 devices. Therefore, the peer-to-peer mobile devices are not capable of actively avoiding communication frequency bands being used by the non-802.11 devices. Currently, the peer-to-peer devices are precluded from using certain types of frequency bands or communications channels to avoid interfering with non-802.11 devices. However, this approach limits the amount of bands that are available for peer-to-peer wireless local area network connections.

BRIEF DESCRIPTION OF THE FIGURES

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED DESCRIPTION OF EMBODIMENTS OF THE INVENTION

Embodiments of the invention are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Embodiments described in this disclosure may provide systems, methods, and apparatus for an 802.11 peer-to-peer wireless local area network to avoid interfering with the transmissions of a non-802.11 device on an as needed based. Mobile devices using various unlicensed communication frequency bands to engage in an 802.11 peer-to-peer wireless local area network connections may interfere with the transmissions of non-802.11 devices sharing the same spectrum. For example, a non-802.11 device may be a radar system or satellite system that operates on a frequency in the 5 GHz spectrum. Starting in 2007, the FCC required 802.11 devices to deploy dynamic frequency selection (DFS) mechanism operating on 5.250-5.350 GHz and 5.47-5.725 GHz. DFS capability avoids interfering with radar and military services by switching to use a different, clear channel across the spectrum. Traditionally, this requirement has been achieved by the wireless access point, scanning channels and dynamically shifting to another channel upon need. In one embodiment, a peer-to-peer wireless local area network may include a laptop in peer-to-peer communication with a wireless display. The peer-to-peer wireless local area network may also be operating at a the 5 GHz frequency, and obligated to support the DFS requirement due to a possibility that the 802.11 and non-802 devices may interfere with each other. The 802.11h standard (See, IEEE 802.11 Standard, IEEE std. 802.11-2007, published Mar. 8, 2007) states that any access point for a master-to-client wireless local area network operating at a frequency greater than 5 GHz should be able to detect the interference and avoid using that channel as needed. However, peer-to-peer devices may not be capable of supporting interference detection hardware due to size and power limitations. Hence, those types of peer-to-peer devices are not able to operate in frequency channels that may interfere with the non-802.11 devices. Accordingly, it would be advantageous to enable peer-to-peer devices to operate in those restricted communications channels without having to add additional detection hardware to the peer-to-peer devices.

In one embodiment, at least two devices may be engaged in a peer-to-peer wireless local area network connection. The two devices may not include hardware to detect non-802.11 devices transmissions that are on the 5 GHz frequency band. However, one of the peer-to-peer devices may be able to establish a master-to-client wireless local area connection with an access point. The peer-to-peer wireless local area network connection may be using the same channel as the master-to-client wireless local area network connection. When the access point detects an interference condition, it may provide a channel change announcement the one peer-to-peer device that is in a master-to-client relationship. Accordingly, in response to the channel change announcement, the peer-to-peer device may change the peer-to-peer wireless local area network connection to a non-interfering channel. Therefore, the peer-to-peer wireless local area network connection may be able to use the 5 GHz frequencies without interfering with the transmissions of the non-802.11 devices. This embodiment enables the additional channels for the peer-to-peer devices without adding additional detection hardware to the peer-to-peer devices. For example, in the United States, 802.11 peer-to-peer devices that lack radar or satellite interference hardware may use 12 overlapping channels to establish wireless local area networks. However, using the techniques described in this disclosure, may enable the 802.11 peer-to-peer devices to use an additional 11 channels that they were previously restricted from using.

Example embodiments of the invention will now be described with reference to the accompanying figures.

Figure 1:
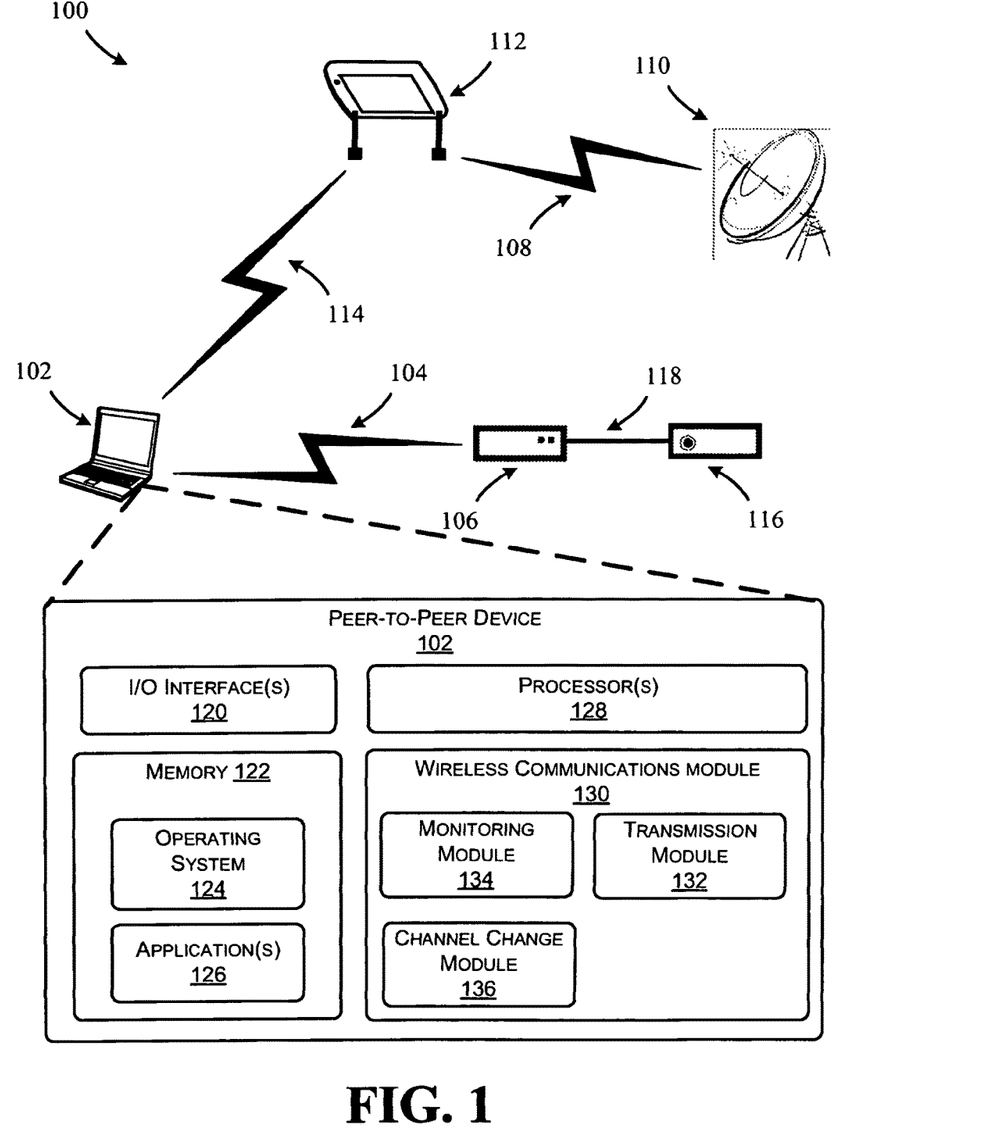
FIG. 1 is a simplified block diagram of a representative environment of an 802.11 peer-to-peer wireless network enabled to avoid interfering with non-802.11 devices on an as needed basis as in accordance with one or more embodiments of the disclosure.

FIG. 1 is a simplified block diagram of a representative environment of an 802.11 peer-to-peer wireless network enabled to avoid interfering with non-802.11 devices on an as needed basis. The environment 100 may include a first peer-to-peer device 102 in a peer-to-peer wireless local area network connection 104 with a second peer-to-peer device 106. In this embodiment, the peer-to-peer devices 102, 106 may lack the native ability to detect transmissions on frequency channels used by a non-802.11 device 110 so they may avoid an interference condition. In one embodiment, the non-802.11 device 110 may be a radar system used to detect airborne objects using electro-magnetic signals. In one embodiment, the non-802.11 device 110 may be using communications channels with frequencies on the 5 GHz frequency band. In another embodiment, the communications channels may include Unlicensed National Information Infrastructure (UNII) channels 52-64 and 100-140.

This embodiment may also include an access point 112 for a master-to-client wireless local area network. The first peer-to-peer device 102 may be engaged in a master-to-client wireless area network connection 114 with the access point 112. In this instance, the access point 112 may be the master device and the peer-to-peer device 102 is the client device. The access point 112 may be a wireless router that sends and receives wireless transmissions for the master-to-client wireless area network connection 114. In this embodiment, the second peer-to-peer device 106 may not be in direct wireless communication with the access point 112 via the master-to-client wireless local area network connection. However, in an alternative embodiment, the second peer-to-peer device may also be included in the master-to-client wireless local area network.

When the access point 112 detects the interfering signal 108 that creates an interference condition with the master-to-client wireless local area network connection 114 and the peer-to-peer wireless local area connection 104, the access point 112 may provide a channel change message to the first peer-to-peer device 102 over the master-to-client wireless local area network connection 114.

In one embodiment, the channel change message may include a notification that the interfering signal 108 is detected. Accordingly, the peer-to-peer device 102 reestablishes the peer-to-peer wireless local area network connection 104 onto a second communications channel that may not include the interfering signal 108. In this embodiment, the first peer-to-peer device 102 may scan the spectrum to find an open channel and then reset the peer-to-peer wireless local area network connection 104 to the second communications channel. The access point 112 may also switch the master-to-client wireless local area network connection 114 to the second communications channel. Alternatively, the access point 112 may also disable the master-to-client wireless local area network connection 114. However, the peer-to-peer wireless local area network connection 104 may remain active whether the master-to-client wireless local area network connection 114 is active or disabled.

In another embodiment, the channel change message may include a notification that the interfering signal 108 is detected and/or an indication of a second communications channel that may not include the interfering signal 108. Accordingly, the peer-to-peer device reestablishes the peer-to-peer wireless local area network connection 104 on the second communications channel provided in the channel change message. Accordingly, the first peer-to-peer device 102 may reset the peer-to-peer wireless local area network connection 104 without having to scan the spectrum to find an open channel.

In one embodiment, the first peer-to-peer device 102 and the second peer-to-peer device 106 may be any peer-to-peer capable computing device such as a computer, laptop, phone, tablet, or any other device capable of sending or receiving wireless signals under a peer-to-peer architecture. In FIG. 1, the first peer-to-peer device 102 is a portable computer and the second peer-to-peer device 106 is a wireless display device that receives images or video from the first peer-to-peer device 102 and displays them via a projector 116. In this instance, the second peer-to-peer device 106 communicates with the projector over a wired communications line 118.

The first peer-to-peer device 102 may also include a plurality of components or modules that interact with each other to perform their desired functions or operations. In one embodiment, the peer-to-peer device 102 may include an Input/Output (I/O) interface 120, memory 122, a computer processor(s) 128, and a wireless communications module 130.

The I/O interface 120 may include a variety of elements that enable the display of content and/or or receiving user inputs. For instance, the I/O interface may include a display, a keyboard, a mouse, a touch screen display, a voice recognition interface, a motion recognition interface, and/or a touchpad.

The memory device 122 or a media storage device may include computer-readable instructions or media. For example, the memory device 122 may include an operating system 124 for the peer-to-peer device 102 that enables the various functions to display content, receive user inputs, or implement various applications or modules. In one embodiment, one or more applications 126 may include a media player, an audio player, and/or a file transfer application. The memory 122 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

The computer processor(s) 128 may be used to execute the computer-readable instructions stored in memory 122 and/or modules that include hardware, software; or a combination thereof. The one or more computer processors 128 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The device 102 may also include a chipset (not shown) for controlling communications between the one or more processors 128 and one or more of the other components of the device 102. In certain embodiments, the device 102 may be based on an Intel® Architecture system and the processor(s) 128 and chipset may be from a family of Intel® processors and chipsets, such as the Intel® Atom® processor family. The one or more processors 128 may also include one or more application-specific integrated circuits (ASICs)

or application-specific standard products (ASSPs) for handling specific data processing functions or tasks.

The peer-to-peer device 102 may also include a wireless communications module 130 that sends, receives, manages, and/or monitors the wireless signals associated with the device 102. For example, the wireless communications module 130 may include transmission module 132 that may include a transmitter and a receiver, or a transceiver (not shown) capable of operating in a broad range of operating frequencies governed by the 802.11 Wireless Standard (See, IEEE 802.11 Standard, IEEE std. 802.11-2007, published Mar. 8, 2007). In this embodiment, the transmission module 132 may send or receive wireless signals pertaining to the master-to-client wireless local area network 114 and the peer-to-peer wireless local area network 104. For example, the transmission module 130 may send video information to the wireless display device 106 over the peer-to-peer wireless area network connection 104 and receive the channel change message over the master-to-client wireless local area network connection 114. Further, the transmission module 130 may receive information over the peer-to-peer wireless area network connection 104 and send information over the master-to-client wireless local area network connection 114.

In this embodiment, the wireless communications module 130 may also include a monitoring module 134 and a channel change module 136. The monitoring module 134 may monitor the incoming and/or outgoing signals on the transmission module 134 for messages from the access point 112 and the second peer-to-peer device 106. In conjunction with the processor 128 and memory 122, the monitoring module 134 may interpret or execute instructions received by the transmission module 132. For example, when the monitoring module 134 detects a channel change message from the access point 112 it may direct the channel change module 136 to reestablish the peer-to-peer network wireless local area network connection 102 on a new or different communications channel. The channel change module 136, in conjunction with the transmission module 132, may reestablish contact by scanning the spectrum to find an available channel and then resetting the peer-to-peer wireless local area network connection 104 using the available communications channel that does not include the interfering signal 108. In another embodiment, monitoring module 134 may detect a notification of a second communications channel in the channel change message. The notification indicates an available channel that does not include the interfering signal 108. Accordingly, the monitoring module 134 may direct the channel change module 136 to reestablish the peer-to-peer wireless local area network connection 104 on the second communications channel. Hence, the channel change module 136 may not have to scan for an available channel in this embodiment.

Figure 2:
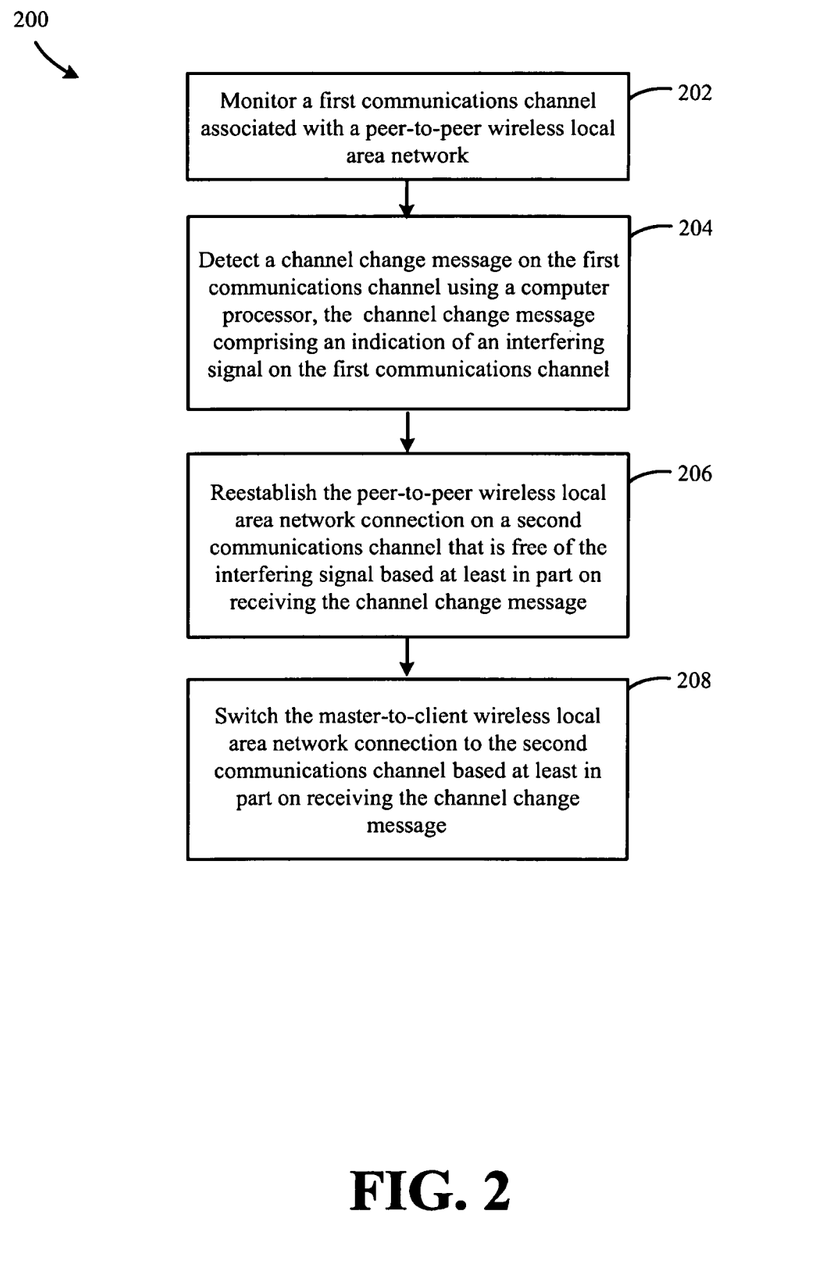
FIG. 2 is a flow diagram illustrating an exemplary method for devices using an 802.11 peer-to-peer network connection to avoid interfering with a non-802.11 device on an as needed basis as in accordance with one or more embodiments of the disclosure.

FIG. 2 is a flow diagram illustrating an exemplary method for devices using an 802.11 peer-to-peer network connection to avoid interfering with a non-802.11 device on an as needed basis. The method 200 may involve a peer-to-peer device 102 that is a member of a peer-to-peer wireless local area network connection 104 and a client in a master-to-client wireless local area network connection 114. For the purpose of illustration and not limitation, the peer-to-peer device 102 is engaged in the peer-to-peer wireless local area network connection 104 with another peer-to-peer device 106 and an access point 112 in the master-to-client wireless local area network connection 114.

At block 202, the monitoring module 134 is monitoring the master-to-client wireless local area network connection 114 and the peer-to-peer wireless local area network connection 104. In one embodiment, the monitoring module 134 is monitoring for messages related to the operation of the wireless local area network connections 102, 114. The monitoring module 134 may detect a variety of messages related to the 802.11 standard (See, IEEE 802.11 Standard, IEEE std. 802.11-2007, published Mar. 8, 2007) for operating wireless local area networks. Upon receipt of any 802.11 message, the monitoring module 134 may take action or direct other modules on the device to perform an action to sustain the wireless local area network connection. In this embodiment, the peer-to-peer wireless local area network connection 104 and the master-to-client wireless local area network connection 114 are both using a first communications channel.

At block 204, the monitoring module 134 detects a channel change message from the access point 112 over the master-to-client wireless local area network connection 114. In one embodiment, the channel change message may provide a notification of an interfering signal 108 on the first communications channel. In one embodiment, the channel change message may be an 802.11h channel switch announcement that informs the master-to-client connection members to be prepared to switch to a new communications channel once the access point 112 has found an interference free channel.

At block 206, the channel change module 136 reestablishes the peer-to-peer wireless local area network connection 104 on a second communications channel that is free of the interfering signal 108. In this embodiment, the channel change is implemented based at least in part on the channel change message received over the master-to-client wireless local area network connection 114. The channel change module 136 may scan the frequency spectrum looking for a second communications channel that may not have traffic. After finding the second communications channel, the change module 136 will reset the peer-to-peer wireless local area network connection 104 on the second communications channel.

At block 208, the master-to-client wireless local area network connection 114 may also be switched to the second communications channel. The access point will direct the channel switching for the master-to-client wireless local area network connection 114 in conjunction with the client device 102.

Figure 3:
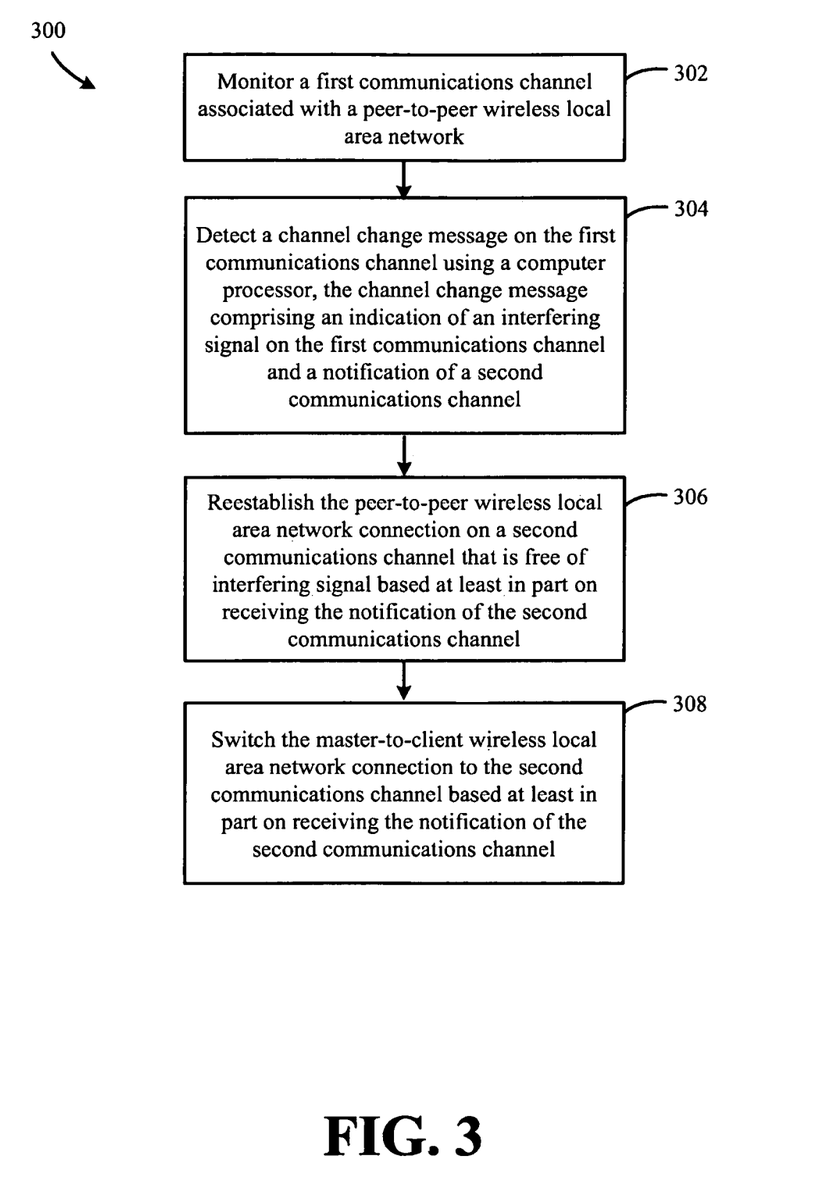
FIG. 3 is a flow diagram illustrating another exemplary method for devices using an 802.11 peer-to-peer network connection to avoid interfering with a non-802.11 device on an as needed basis as in accordance with one or more embodiments of the disclosure.

FIG. 3 is a flow diagram illustrating another exemplary method for devices using an 802.11 peer-to-peer network connection to avoid interfering with a non-802.11 device on an as needed basis. The method 300 may involve a peer-to-peer device 102 that is a member in a peer-to-peer wireless local area network connection 104 and a client in a master-to-client wireless local area network connection 114. For the purpose of illustration and not limitation, the peer-to-peer device 102 is engaged in the peer-to-peer wireless local area network connection 104 with another peer-to-peer device 106 and an access point in the master-to-client wireless local area network connection 114.

At block 302, the monitoring module 134 is monitoring the master-to-client wireless local area network connection 114 and the peer-to-peer wireless local area network connection 104. In one embodiment, the monitoring module 134 is monitoring for messages related to the operation of the wireless local area network connections 102, 114. The monitoring module 134 may detect a variety of messages related to the 802.11 standard (See, IEEE 802.11 Standard, IEEE std. 802.11-2007, published Mar. 8, 2007) for operating wireless local area networks. Upon receipt of any 802.11 message, the monitoring module 134 may take action or direct other modules on the device to perform an action to sustain the wireless local area network connection. In this embodiment, the peer-to-peer wireless local area network connection 104 and the master-to-client wireless local area network connection 114 are both using a first communications channel.

At block 304, the monitoring module 134 detects a channel change message from the access point 112 over the master-to-client wireless local area network connection 114. In one embodiment, the channel change message may provide a notification of an interfering signal 108 on the first communications channel and/or a notification of a second communication channel that the channel change module 136 should use to avoid interfering with the non-802.11 device 110. In one embodiment, the channel change message may be an 802.11h channel switch announcement and a plurality of beacons that include the second communications channel notification. Hence, the channel change module 136 resets the peer-to-peer wireless local area connection 104 members to the second communications channel. In one embodiment, the interfering signal 108 may be originating from a radar system. In an alternative embodiment, the interfering signal 108 may be originating from a satellite system.

At block 306, the channel change module 136 reestablishes the peer-to-peer wireless local area network connection 102 on the second communications channel that is free of the interfering signal 108. In this embodiment, the channel change is implemented based at least in part on the channel change message received over the master-to-client wireless local area network connection 114. The channel change module 136 will reset the peer-to-peer wireless local area network connection 102 on the second communications channel.

At block 308, the master-to-client wireless local area network connection 114 may also be switched to the second communications channel. The access point will direct the channel switching for the master-to-client wireless local area network connection 114 in conjunction with the client device 102.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms, and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The following examples pertain to further embodiments. A device comprising a wireless transceiver that sends and receives wireless electronic communications over a first communications channel associated with a peer-to-peer wireless local area network connection, a monitoring module that monitors the first communications channel for a channel change message comprising an indication of an interfering signal on the first communications channel, and a channel change module that reestablishes the peer-to-peer wireless local area network connection to a second communications channel that is free of the interfering signal based at least in part on receiving the channel change message.

In one embodiment, the wireless transceiver scans a spectrum of communications channels to locate the second communications channel and the channel change module resets the peer-to-peer wireless local area network connection on the second communications channel.

In one embodiment, wherein the channel change message comprising a notification of the second communications channel, and the channel change module resets the peer-to-peer wireless local area network connection on the second communications channel that is provided in the channel change message. The second communications channel on an allowed channel of a 5 GHz frequency spectrum.

In one embodiment, the interfering signal is from a radar system. In an alternative embodiment, the interfering signal is from a satellite system.

The device further includes a first communications channel that is associated with a master-to-client wireless local area network connection. The channel change module switches the master-to-client wireless local area network connection to the second communications channel based at least in part on receiving the channel change message. In addition, the channel change module may disable the master-to-client wireless local area network connection. Lastly, the master-to-client wireless local area network connection comprising an access point that provides the channel change message.

A method comprising monitoring a first communications channel associated with a peer-to-peer wireless local area network connection, detecting a channel change message on the first communications channel using a computer processor, the channel change message comprising an indication of an interfering signal on the first communications channel, and reestablishing the peer-to-peer wireless local area network connection on a second communications channel that is free of the interfering signal based at least in part on receiving the channel change message.

In one embodiment, reestablishing the peer-to-peer wireless local area network connection comprising scanning a spectrum of communications channels to locate the second communications channel, and resetting the peer-to-peer wireless local area network connection on the second communications channel.

In another embodiment, the channel change message comprising a notification of the second communications channel and wherein reestablishing the peer-to-peer wireless local area network connection comprising resetting the peer-to-peer wireless local area network connection on the second communications channel that is provided in the channel change message.

In one embodiment, the second communications channel comprising a frequency on one or more allowed channels on the 5 GHz unlicensed spectrum.

In one embodiment, the interfering signal is from a radar system. In an alternative embodiment, the interfering signal is from a satellite system.

In another embodiment, the first communications channel is associated with a master-to-client wireless local area network connection.

In yet another embodiment, the method is further comprising switching the master-to-client wireless local area network connection to the second communications channel based at least in part on receiving the channel change message.

The method further comprising disabling the master-to-client wireless local area network connection.

In another embodiment, the master-to-client wireless local area network connection comprising an access point that provides the channel change message.

In another embodiment, the one or more computer-readable media comprising computer-executable instructions operable to, when executed by at least one processor, enable the at least one processor to implement the method described above.

The claimed invention is:

1. A method comprising:
monitoring messages from an access point on a first communications channel, the first communications channel associated with a master-to-client wireless local area network connection and a peer-to-peer wireless local area network connection, wherein the messages comprise an indication of at least one operation of the master-to-client wireless local area network connection and the peer-to-peer wireless local area network connection;
detecting a channel change message from the access point using the master-to-client wireless local area network connection on the first communications channel using a computer processor, wherein the channel change message comprises: an indication of an interfering signal of a non-802.11 device on the first communications channel;
reestablishing the peer-to-peer wireless local area network connection on a second communications channel by scanning a spectrum of communications channels to locate the second communications channel that is free of the interfering signal of the non-802.11 device based at least in part on receiving the channel change message using the master-to-client wireless local area network connection; and
switching the master-to-client wireless local area network connection to the second communications channel or disabling the master-to-client wireless local area network connection based at least in part on receiving the channel change message over the master-to-client wireless local area network connection, wherein the peer-to-peer wireless local area network connection remains active whether the master-to-client wireless local area network connection is active or disabled.

2. The method of claim 1, wherein reestablishing the peer-to-peer wireless local area network connection comprises:
resetting the peer-to-peer wireless local area network connection on the second communications channel.

3. The method of claim 1, wherein the channel change message comprises a notification of the second communications channel and wherein reestablishing the peer-to-peer wireless local area network connection comprises resetting the peer-to-peer wireless local area network connection on the second communications channel that is provided in the channel change message.

4. The method of claim 1, wherein the second communications channel comprises a frequency on one or more allowed channels on a 5 GHz unlicensed spectrum.

5. The method of claim 1, wherein the interfering signal is from a radar system.

6. The method of claim 1, wherein the interfering signal is from a satellite system.

7. The method of claim 1, further comprising switching the master-to-client wireless local area network connection to the second communications channel based at least in part on receiving the channel change message.

8. The method of claim 1, further comprising disabling the master-to-client wireless local area network connection.

9. The method of claim 1, wherein the master-to-client wireless local area network connection comprises an access point that provides the channel change message.

10. One or more tangible computer-readable storage devices comprising computer-executable instructions operable to, when executed by at least one processor, enable the at least one processor to implement a method comprising:
monitoring messages from an access point on a first communications channel, the first communications channel associated with a master-to-client wireless local area network connection and a peer-to-peer wireless local area network connection, wherein the messages comprise an indication of at least one operation of the master-to-client wireless local area network connection or the peer-to-peer wireless local area network connection;
detecting a channel change message from the access point using the master-to-client wireless local area network connection on the first communications channel using a computer processor, wherein the channel change message comprises: an indication of an interfering signal of a non-802.11 device on the first communications channel;

reestablishing the peer-to-peer wireless local area network connection on the second communications channel by scanning a spectrum of communications channels to identify the second communications channel that is free of the interfering signal of the non-802.11 device based at least in part on receiving the channel change message using the master-to-client wireless local area network connection; and switching the master-to-client wireless local area network connection to the second communications channel or disabling the master-to-client wireless local area network connection based at least in part on receiving the channel change message over the master-to-client wireless local area network connection, wherein the peer-to-peer wireless local area network connection remains active whether the master-to-client wireless local area network connection is active or disabled.

11. The one or more tangible computer-readable storage devices of claim 10, wherein reestablishing the peer-to-peer wireless local area network connection comprises:

resetting the peer-to-peer wireless local area network connection on the second communications channel.

12. The one or more tangible computer-readable storage devices of claim 10, wherein the channel change message comprises a notification of the second communications channel, and wherein reestablishing the peer-to-peer wireless local area network connection comprises resetting the peer-to-peer wireless local area network connection on the second communications channel that is provided in the channel change message.

13. The one or more tangible computer-readable storage devices of claim 10, wherein the second communications channel comprises a channel on a 5 GHz frequency band.

14. The one or more tangible computer-readable storage devices of claim 10, wherein the interfering signal is from a radar system.

15. The one or more tangible computer-readable storage devices of claim 10, wherein the interfering signal is from a satellite system.

16. The one or more tangible computer-readable storage devices of claim 10, further comprising switching the master-to-client wireless local area network connection to the second communications channel based at least in part on receiving the channel change message.

17. The one or more tangible computer-readable storage devices of claim 10, further comprising disabling the master-to-client wireless local area network connection.

18. The one or more tangible computer-readable storage devices of claim 10, wherein the master-to-client wireless local area network connection comprises an access point that provides the channel change message.

19. A device comprising:

a wireless communications module comprising a wireless transceiver;

at least one memory storing computer-executable instructions; and at least one processor, wherein the at least one processor is configured to access the at least one memory and to execute the computer-executable instructions to:

instruct the wireless communications module to send and receive wireless electronic communications from an access point over a first communications channel associated with a master-to-client wireless local area network connection and a peer-to-peer wireless local area network connection, wherein the wireless electronic communications comprise messages comprising an indication of at least one operation of the master-to-client wireless local area network connection or the peer-to-peer wireless local area network connection;

instruct the wireless communications module to monitor the messages from the access point using the master-to-client wireless local area network connection on the first communications channel for a channel change message, wherein the channel change message comprises: an indication of an interfering signal of a non-802.11 device on the first communications channel;

instruct the wireless communications module to reestablish the peer-to-peer wireless local area network connection to the second communications channel by scanning a spectrum of communications channels to identify the second communications channel that is free of the interfering signal of the non-802.11 device based at least in part on receiving the channel change message using the master-to-client wireless local area network connection; and instruct the wireless communications module to switch the master-to-client wireless local area network connection to the second communications channel or disabling the master-to-client wireless local area network connection based at least in part on receiving the channel change message over the master-to-client wireless local area network connection, wherein the peer-to-peer wireless local area network connection remains active whether the master-to-client wireless local area network connection is active or disabled.

20. The device of claim 19, wherein the at least one processor is configured to access the at least one memory and to execute the computer-executable instructions to:

instruct the wireless communications module to reset the peer-to-peer wireless local area network connection on the second communications channel.

21. The device of claim 19, wherein the channel change message comprises a notification of the second communications channel, and wherein the at least one processor is configured to access the at least one memory and to execute the computer-executable instructions to:

instruct the wireless communications module to reset the peer-to-peer wireless local area network connection on the second communications channel that is provided in the channel change message.

22. The device of claim 19, wherein the second communications channel comprises a frequency greater than 5 GHz.

23. The device of claim 19, wherein the interfering signal is from a radar system.

24. The device of claim 19, wherein the interfering signal is from a satellite system.

25. The device of claim 19, wherein the at least one processor is configured to access the at least one memory and to execute the computer-executable instructions to:

instruct the wireless communications module to switch the master-to-client wireless local area network connection to the second communications channel based at least in part on receiving the channel change message.

26. The device of claim 19, wherein the at least one processor is configured to access the at least one memory and to execute the computer-executable instructions to:

instruct the wireless communications module to disable the master-to-client wireless local area network connection.

27. The device of claim 19, wherein the master-to-client wireless local area network connection comprises an access point that provides the channel change message.

* * * * *